(12) United States Patent
Lei

(10) Patent No.: US 12,452,951 B2
(45) Date of Patent: Oct. 21, 2025

(54) CYCLE CONFIGURATION METHOD, RELATED DEVICE, AND STORAGE MEDIUM

(71) Applicant: TENCENT TECHNOLOGY (SHENZHEN) COMPANY LIMITED, Shenzhen (CN)

(72) Inventor: Yixue Lei, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 459 days.

(21) Appl. No.: 17/981,773

(22) Filed: Nov. 7, 2022

(65) Prior Publication Data

US 2023/0056874 A1    Feb. 23, 2023

Related U.S. Application Data

(63) Continuation of application No. PCT/CN2021/128564, filed on Nov. 4, 2021.

(30) Foreign Application Priority Data

Nov. 27, 2020 (CN) .......................... 202011368921.5

(51) Int. Cl.
*H04W 76/28* (2018.01)
*H04W 28/02* (2009.01)

(52) U.S. Cl.
CPC ....... *H04W 76/28* (2018.02); *H04W 28/0268* (2013.01)

(58) Field of Classification Search
CPC ... H04W 28/0268; H04W 4/40; H04W 52/02; H04W 52/0216; H04W 76/27; H04W 76/28; Y02D 30/70
See application file for complete search history.

(56) References Cited

U.S. PATENT DOCUMENTS

2013/0215809 A1    8/2013    Chang et al.
2021/0176708 A1    6/2021    Liu

FOREIGN PATENT DOCUMENTS

CN    102421148 A    4/2012
CN    103402245 A    11/2013
CN    109451842 A    3/2019

OTHER PUBLICATIONS

Lenovo, Motorola Mobility ("KI#1, Sol#5: PC5 DRX configuration for Rx UEs", 3GPP TSG-SA WG2 Meeting #142e, S2-2009488, Nov. 16-20, 2020) (Year: 2020).*

(Continued)

*Primary Examiner* — Ji-Hae Yea
(74) *Attorney, Agent, or Firm* — Anova Law Group, PLLC

(57) ABSTRACT

A cycle configuration method includes: obtaining the Quality-of-Service information and service mode information of the V2X service, and the service mode information including the data burst degree information; generating the cycle configuration information of the DRX cycle of V2X service according to the Quality-of-Service information and service mode information. The cycle configuration information includes: any one or more of the DRX cycle duration of the DRX cycle, the activation period duration of the activation period, and the dormancy period duration of the dormancy period.

18 Claims, 6 Drawing Sheets

(56) References Cited

OTHER PUBLICATIONS

3GPP TS 23.287 (3rd Generation Partnership Project; Technical Specification Group Services and System Aspects; Architecture enhancements for 5G System (5GS) to support Vehicle-to-Everything (V2X) services (Release 16), V16.4.0, Sep. 24, 2020) (Year: 2020).*

The World Intellectual Property Organization (WIPO) International Search Report for PCT/CN2021/128564 Jan. 10, 2022 6 Pages (including translation).

"KI #1, Sol #1: Update to clarify application requirements and PC5 DRX schedule generation", Oct. 23, 2020, SA WG2 Meeting #141E (e-meeting), Elbonia.

"KI #1, Sol #1: Update to clarify application requirements and PC5 DRX schedule generation(Revision of S2-2007203r01)" Oct. 23, 2020, SA WG2 Meeting #141E (e-meeting), Elbonia.

* cited by examiner

CYCLE CONFIGURATION METHOD, RELATED DEVICE, AND STORAGE MEDIUM

RELATED APPLICATION(S)

This application is a continuation application of PCT Patent Application No. PCT/CN2021/128564 filed on Nov. 4, 2021, which claims priority to Chinese Patent Application No. 202011368921.5, entitled "CYCLE CONFIGURATION METHOD, RELATED DEVICE, AND STORAGE MEDIUM" and filed with the Chinese Patent Office on Nov. 27, 2020, all of which are incorporated herein by reference in entirety.

FIELD OF THE TECHNOLOGY

The present disclosure relates to the field of Internet technologies, and in particular, relates to the field of communication technologies, and in particular, relates to cycle configurations.

BACKGROUND

V2X is an abbreviation for vehicle to everything, for example, vehicle wireless communication technologies. The V2X technology is to achieve information exchange between a vehicle and all entities that may affect the vehicle. The V2X technology can include Vehicle to Vehicle (V2V), Vehicle to Infrastructure (V2I), Vehicle to Pedestrian (V2P), Vehicle to Network (V2N), and many other technologies. A communication protocol involved in the V2X technology may be referred to as a V2X protocol; the V2X protocol is initially designed for vehicle terminals. In V2X communication, for a Vehicle UE (V-UE), energy consumption is not a problem because power can be obtained from a power source of the vehicle, but for a Pedestrian UE (P-UE), an electric quantity of a battery of a terminal is limited. Since the V2X protocol transmits a messages (for example, service data) using broadcasting as an important propagation mode, this may result in a large number of V2X messages being redundant, rendering excessive power consumption by a terminal device in the V2X, (for example, a P-UE terminal (i.e., a user terminal) in the V2P).

Discontinuous Reception (DRX) cycle configuration mode is commonly used for achieving V2X power saving, to solve the energy consumption problem of the terminal device in the V2X. One DRX cycle may include an activation period and a dormancy period. When a terminal is in an activation period, the terminal may monitor a sublink control channel to receive data of the V2X service. When the terminal is in the dormant period, the terminal can stop monitoring the sublink control channel to achieve the purpose of saving power.

SUMMARY

The present disclosure provides a cycle configuration method, a related device, and a storage medium, and a DRX cycle adapted to the V2X service can be relatively well configured.

In an aspect, the present disclosure provides a cycle configuration method, performed by a computing device, the method including: obtaining Quality-of-Service information and service mode information of a V2X service, the service mode information including data burst degree information, and the data burst degree information being obtained according to a data amount of service data of the V2X service; and the service mode information further including data cyclicity or data acyclicity, where the data cyclicity or data acyclicity can be determined from a service type determination, and can also be obtained according to V2X service traffic statistics, determining, and learning; generating cycle configuration information of a DRX cycle of the V2X service according to the Quality-of-Service information and the service mode information; the DRX cycle including: an activation period and a dormancy period, the cycle configuration information including any one or more of a DRX cycle duration of the DRX cycle, an activation period duration of the activation period, and a dormancy period duration of the dormancy period.

In another aspect, the present disclosure provides a cycle configuration device, including: a memory storing computer program instructions; and a processor coupled to the memory and configured to execute the computer program instructions and perform: obtaining Quality-of-Service information and service mode information of a vehicle wireless communication technology V2X service, the service mode information including data burst degree information, and the data burst degree information being obtained according to a data amount of service data of the V2X service; generating cycle configuration information of a discontinuous reception DRX cycle of the V2X service according to the Quality-of-Service information and the service mode information; the DRX cycle including an activation period and a dormancy period, and the cycle configuration information including: any one or more of a DRX cycle duration of the DRX cycle, an activation period duration of the activation period, and a dormancy period duration of the dormancy period.

In yet another aspect, the present disclosure provides a cycle configuration method, including: in response to detecting that a V2X service is generated, configuring according to cycle configuration information of a DRX cycle determined for the V2X service, so as to transmit service data corresponding to the V2X service; where the cycle configuration information is generated according to Quality-of-Service information and service mode information, the service mode information includes data burst degree information, and the data burst degree information is obtained according to a data amount of service data of the V2X service; and the service mode information further including data cyclicity or data acyclicity, where the data cyclicity or data acyclicity can be determined from a service type, and can also be obtained according to V2X service traffic statistics, determining, and learning; the DRX cycle includes: an activation period and a dormancy period, the cycle configuration information including: any one or more of a DRX cycle duration of the DRX cycle, an activation period duration of the activation period, and a dormancy period duration of the dormancy period.

In yet another aspect, the present disclosure provides a smart terminal, including a memory and a processor, the memory being configured to store a computer program; and the processor running the computer program to implement the cycle configuration method.

In yet another aspect, the present disclosure provides a computer storage medium, storing a computer program, and the computer program being configured to perform the cycle configuration method;

In yet another aspect, the present disclosure provides a computer program product including instructions, the instructions, when running on a computer, causing the computer to perform the cycle configuration method.

When generating the cycle configuration information, the Quality-of-Service information and service mode information of the V2X service are considered. For a certain specific V2X service, more reasonable and targeted DRX cycle configuration information can be generated. The terminal configured according to the DRX cycle configuration information can not only better ensure that service quality desirables are met during the transmission of the service data, but also save the power of the terminal and increase the standby duration of the terminal.

The embodiments of the present disclosure configure the DRX cycle by considering the relevant information of the V2X service, so that the configured DRX cycle is adapted to the V2X service, improving the rationality of the DRX cycle.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

Figure 1A:
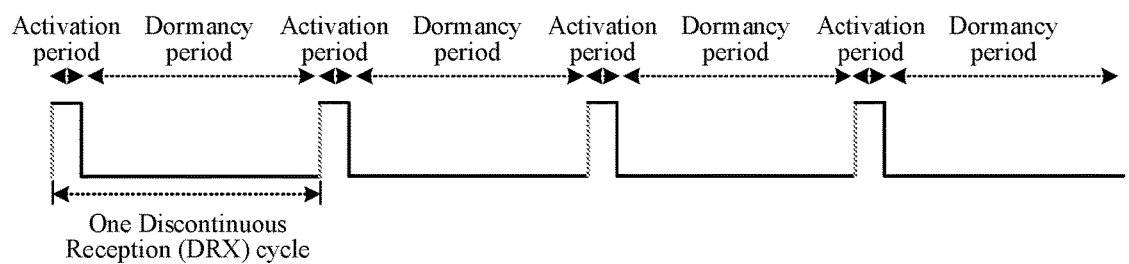
FIG. 1a is a schematic diagram of a DRX cycle according to certain embodiment(s) of the present disclosure.

For the terminal in the V2X system, configuration of the DRX cycle is important for achieving power saving. The DRX configuration includes the configuration of the DRX cycle (the DRX cycle duration) and the ON/OFF period (the activation period/dormancy period durations). one DRX cycle consists of ON period+OFF period, as shown in FIG. 1a. In order to be able to better configure a DRX cycle adapted to the V2X service for the terminal, the embodiment of the present disclosure proposes a cycle configuration solution for generating a DRX cycle according to traffic mode information (or service mode information) and Quality-of-Service (QoS) information, and can support the terminal to achieve the power saving function.

Figure 1B:
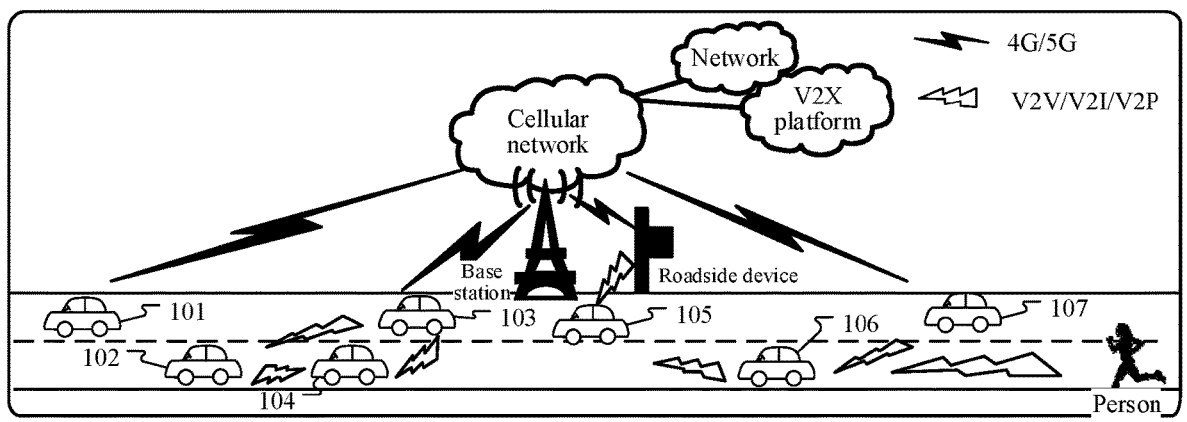
FIG. 1b is a schematic system architecture diagram of a V2X system according to certain embodiment(s) of the present disclosure.

The V2X system involved in the embodiment of the present disclosure may be referred to and as shown in FIG. 1b. The terminal in the V2X system may include, but not limited to: a plurality of vehicles and other objects with which information can be exchanged with each vehicle. As shown in FIG. 1b, the included vehicles may be vehicle 101, vehicle 102, vehicle 103, vehicle 104, and so on. The other objects herein may include, but not limited to: person (a user equipment), roadside infrastructure and networks, etc. Any two vehicles can exchange information through the V2V technology, and any vehicle and other objects can exchange information through V2P/V2I/V2N and other technologies. In practical applications, the V2X system can be built based on any communication technology, such as 4th generation mobile communication technology (4G), 5th generation mobile networks (5G), 5G evolutionary technology (Beyond 5G) technology, etc. For ease of elaboration, a 5G built V2X system is subsequently used as an example for explanation.

Figure 1C:
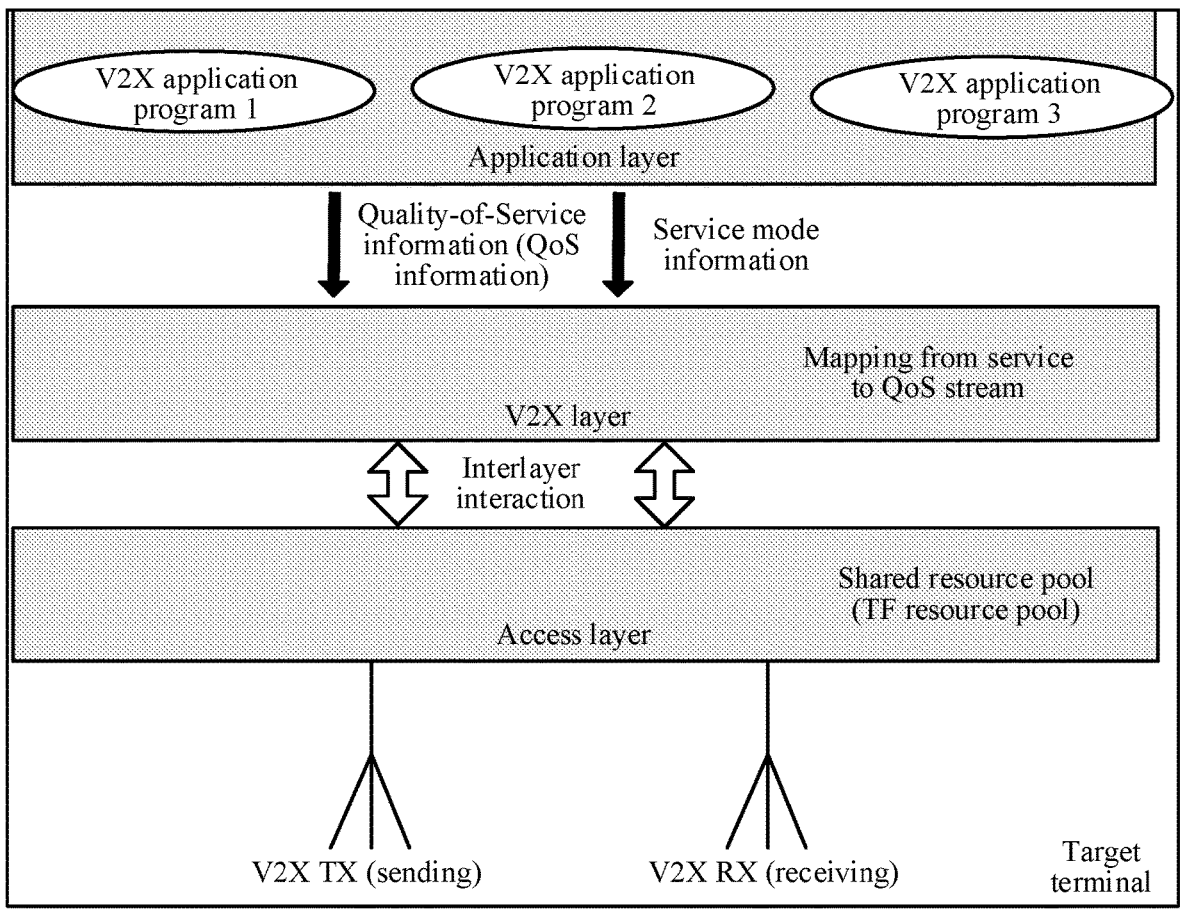
FIG. 1c is a schematic structural diagram of a terminal according to certain embodiment(s) of the present disclosure.

The aforementioned terminal may include any of the following: P-UE (i.e., a user terminal) in V2P, a vehicle in V2V, a road device in V2I, etc. For ease of elaboration, for the terminal to be the P-UE (i.e., the user terminal) in V2P is subsequently used as an example for explanation. Referring to FIG. 1c, the terminal may include at least: an application layer, a V2X Layer, an Access Stratum (an AS layer), and other processing layers. Different processing layers can implement different logical and protocol functions, as follows:

The application layer may include one or more V2X applications (V2X apps), which are used for supporting the terminal to provide the V2X service, generate relevant service data when the terminal provides the V2X service, and submit the service data to the bottom layer for sending; and to receive a service packet of the V2X service from the bottom layer, and perform data processing on the received service packet. The V2X layer is a protocol layer that implements the 5G V2X function, which can service the V2X app in the application layer, and generate a corresponding V2X protocol message to interact with Application Function (AF), Policy Control Function (PCF), and other protocol entities (or referred to as network element functional entities), and is an important protocol layer in the V2X system architecture. The AS layer may include a PC5 (a direct communication interface) air interface protocol layer, a Packet Data Convergence Protocol (PDCP)/Radio Link Control (RLC)/Media Access Control (MAC)/Physical Port Layer (PHY); it is primarily used for implementing the functions of receiving and sending the V2X message content (for example, service data) on the PC5 interface on an actual physical resource, and the V2X message content herein may include, but not limited to: V2P message content, V2V message content, V2I message content, etc.

In the specific implementation, the general principle of the cycle configuration solution is as follows:

First, the one or more V2X apps in the application layer of the terminal may also provide one or more service attribute information to the V2X layer as follows:

① Service type information of the V2X service can be provided to the V2X layer, which can carry ITS-AID, PS-ID, or AID; where ITS-AID and PS-ID are identities used for the V2X application layer message set defined in the United States and Europe.

Application ID (AID) is an identifier used for the V2X application layer message set defined in China.

In the implementation, the service type information can be used for calculating the Quality of Service (QoS) information and service mode information of the V2X service.

② A Quality-of-Service (QoS) parameter of the V2X service can be provided to the V2X layer, which may include, but not limited to, delay tolerance information. The so-called delay tolerance refers to the tolerance of data waiting duration, the level of measurement of which can be the waiting duration of an application layer data packet in a buffer.

It is to be explained that the mode for the application layer to provide the QoS parameter of the V2X service is suitable when the application layer can derive the PC5 QoS parameter information. If the application layer cannot derive the PC5 QoS parameter information, the method proposed in the present disclosure is used. In addition, the method provided in the present disclosure is also suitable when, although the application layer can provide the PC5 QoS parameters, these PC5 QoS parameters cannot fully support the DRX cycle configuration.

③ The service mode parameter of the V2X service can be provided to the V2X layer, which may include, but not limited to: data cyclicity or data acyclicity of the V2X service, data burst degree information of the V2X service, etc. The data cyclicity can be used for indicate the service data arrival cycle duration of the V2X service; The data burst degree information can be used for indicating the data amount (i.e., the number of bytes) of the historical data package generated each time by the V2X service.

It is to be explained that the mode for the application layer to provide the service mode parameter of the V2X service is suitable when the application layer can calculate the service mode information such as data cyclicity, data acyclicity, and data burst degree information of the V2X service.

The V2X layer may send the service attribute information provided by the application layer to a computational processing module such as an Access Stratum (AS) layer. Correspondingly, the computational processing module can obtain the QoS information and service mode information of the V2X service according to the service attribute information sent by the V2X layer, and configure the DRX cycle according to the QoS information and service mode information to generate the cycle configuration information of the DRX cycle of the V2X service. Since one DRX cycle may include an activation period and a dormancy period, the cycle configuration information generated by the computational processing module may include at least: a DRX cycle duration (i.e., the DRX cycle) of the DRX cycle. Further, the cycle configuration information generated by the computing device may further include: one or more of the activation period duration of the activation period (i.e., the ON period), and the dormancy period duration of the dormancy period (i.e., the OFF period).

In the cycle configuration solution, the computational processing module obtains relevant information such as the QoS information and service mode information of the V2X service, and configures the DRX cycle of the V2X service on this basis. This allows the terminal to not only save the power of the terminal when performing data communication of the V2X service based on the DRX cycle (such as receiving downlink data and uplink authorization), to increase the standby duration of the terminal so as to improve the user experience; but also enables the DRX cycle to be adapted to the service characteristics of the V2X service (for example, delay tolerance, data cyclicity, or data burst degree), which can improve the accuracy of the V2X service, increasing the success rate of terminal for receiving the downlink data based on the DRX cycle to a certain extent.

It is to be explained that in other embodiments, the V2X layer can also send the service attribute information provided by the application layer to the computing device. The computing device obtains the QoS information and service mode information of the V2X service according to the service attribute information sent by the V2X layer, and configures the DRX cycle according to the QoS information and service mode information to generate the cycle configuration information of the DRX cycle of the V2X service. The computing device herein may include, but not limited to: network element functional entities such as AF/PCF, mobile communication base stations (abbreviated as base stations) or servers, etc. Moreover, the QoS information and service mode information mentioned above are related to the characteristics of V2X service itself. In other embodiments, the QoS information and service mode information can also be provided by the server corresponding to the V2X service.

Figure 2:
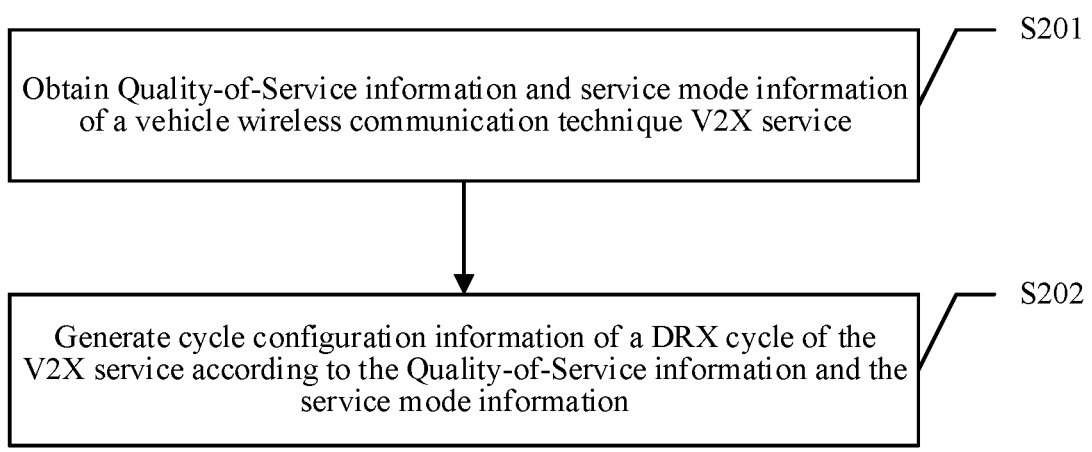
FIG. 2 is a schematic flowchart of a cycle configuration method according to certain embodiment(s) of the present disclosure.

Based on the description, the embodiment of the present disclosure provides a cycle configuration method. The cycle configuration method can be executed by the aforementioned computational processing module (e.g., the AS layer) or the computing device (e.g., the aforementioned terminal). For ease of elaboration, for the cycle configuration method to be executed by the computing device is subsequently taken as an example for explanation. Referring to FIG. 2, the cycle configuration method may include the following S201-S202:

S201. Obtain Quality-of-Service information and service mode information of a vehicle wireless communication technique V2X service.

The Quality-of-Service information and service mode information of the V2X service may be provided by the terminal, or may be provided by the server corresponding to the V2X service; The number of terminals herein may be one or more, which is not limited. The V2X service may be any one service provided by the terminal based on the V2X technology, such as the V2P service provided based on the V2P technology, the V2I service provided based on the V2I technology, and so on. The Quality-of-Service information and service mode parameter of the V2X service may be determined according to service attribute information provided by at least one application in an application layer in the terminal. The service attribute information includes Quality-of-Service information and service mode information, and may further include service type information.

The Quality-of-Service information may include at least delay tolerance information. The delay tolerance information is determined according to the transmission waiting duration of the service data of the V2X service, and the transmission waiting duration referred to herein refers to the waiting duration from the generation of the service data to the successful transmission. For example, the V2X service generates service data at 12 o'clock, 10 minutes, 30 seconds, and 10 milliseconds, while the service data is successfully sent at 12 o'clock, 10 minutes, 30 seconds, and 40 milliseconds, and the transmission waiting duration for the service data is 30 milliseconds (ms). In an alternative embodiment, the transmission waiting duration may include a maximum waiting duration for the service data of the V2X service in a buffer. The maximum waiting duration herein refers to the maximum duration that the service data of the V2X service can be buffered in the buffer. When the duration of the service data of the V2X service in the buffer exceeds the maximum waiting duration, the service data is backed off.

The service mode information may include at least data burst degree information of the V2X service. The data burst degree information is obtained according to the data amount of the service data of the V2X service, which can be used for indicating the data amount of the V2X service within a specific duration. In certain embodiment(s), the data burst degree information may include, but not limited to: the data amount of at least one historical data packet generated by the V2X service, the interval duration between various historical data packets, and so on. It is to be explained that the historical data packet mentioned herein may be a data packet generated and sent by the terminal when the terminal historically provides the V2X service; or, the terminal receives the data packet sent by other devices when the terminal historically communicates with other devices (for example, the vehicles) based on the V2X service. In certain embodiment(s), the service mode information may also include a data cyclicity parameter or a data acyclicity parameter of the V2X service. When the V2X service is a cyclical service, the service mode information may also include the service data arrival cycle duration of the V2X service. The service data arrival cycle referred to herein may refer to the transmission cycle of the service data of the V2X service, the duration of which may be used for reflecting the time interval between the arrival of the service data of the V2X service at the communication interface (e.g., the PC5 interface).

S202. Generate cycle configuration information of a DRX cycle of the V2X service according to the Quality-of-Service information and the service mode information.

As can be seen from the foregoing, the DRX cycle includes an activation period and a dormancy period. Correspondingly, the cycle configuration information may include any one or more of a DRX cycle duration of the DRX cycle, an activation period duration of the activation period, and a dormancy period duration of the dormancy period. After obtaining the cycle configuration information, the cycle configuration information can be sent to the terminal, so that when the V2X service is generated, the terminal can configure the DRX cycle according to the cycle configuration information, so as to transmit the service data of the V2X service according to the configured DRX cycle to achieve the purpose of power saving.

A configuration algorithm of the DRX cycle will be described below according to two conditions where the V2X service is a cyclical service or an acyclical service.

(I) V2X Service is a Cyclical Service:

1) For the cyclical V2X service, the configuration algorithm of the DRX cycle duration is as follows:

First, the V2X service has delay tolerance information, while the delay tolerance information is determined according to the transmission waiting duration of the service data of the V2X service, and therefore, in order to ensure that the service data of the V2X service can be transmitted in a timely manner, the DRX cycle duration may be less than the waiting duration indicated by the delay tolerance. The waiting duration indicated by the delay tolerance may be equal to the transmission waiting duration mentioned above, or may be close to (i.e., greater than or less than) the transmission waiting duration mentioned above, which is not limited.

Second, the service mode information may further include: a service data arrival cycle duration of the V2X service. Therefore, computing device may also determine a configuration cycle duration for the DRX cycle for the V2X service according to the service data arrival cycle duration. Moreover, as the V2X service has different desirables for data delay, the relationship between the DRX cycle duration and the service data arrival cycle duration of the V2X service is also different.

① If the V2X service has high desirables for data delay, for example, the waiting duration indicated by the delay tolerance information is less than a first threshold (the first threshold can be set according to an experience value or service desirables), it is indicated that once the data of the V2X service reaches a communication interface, it is subjected to sending and receiving processings. Therefore, if the DRX cycle duration of the DRX cycle being greater than the service data arrival cycle duration of the V2X service cannot be accepted, the DRX cycle configuration close to the service data arrival cycle duration of the V2X service can be selected to ensure that the service data of the V2X service can be transmitted in a timely manner. That is, in this scenario, the DRX cycle duration can be less than or equal to the service data arrival cycle duration.

Since the DRX cycle duration is limited, its value is usually 2k; k is an integer not less than 0, i.e., the values of the DRX cycle are 1 ms, 2 ms, 4 ms, 8 ms, 16 ms, . . . ; and therefore, the generated DRX cycle duration being less than or equal to the service data arrival cycle duration means: the generated DRX cycle duration is less than the maximum cycle duration of all candidate cycle durations of the service data arrival cycle duration; or the generated DRX cycle duration is equal to the service data arrival cycle duration. Each candidate cycle duration satisfies the constraint of 2k, and is less than the service data arrival cycle duration. For example, if the service data arrival cycle duration is set to 10 ms, the candidate cycle duration may include: 1 ms, 2 ms, 4 ms, and 8 ms.

In one implementation, regardless of whether the service data arrival cycle satisfies the constraint of 2n, the generated DRX cycle durations may all be the maximum cycle duration of all candidate cycle durations that are less than the service data arrival cycle duration. In one implementation, if the service data arrival cycle duration satisfies the constraint of 2n, the DRX cycle duration may be equal to the service data arrival cycle duration. If the service data arrival cycle duration does not satisfy the constraint of 2k, the DRX cycle duration may be the maximum cycle duration of all candidate cycle durations that are less than the service data arrival cycle duration. For example, the service data arrival cycle duration is 10 ms, the candidate cycle duration may include: 1 ms, 2 ms, 4 ms, and 8 ms. Since the maximum cycle duration of these candidate cycles less than the service data arrival cycle duration (10 ms) is 8 ms, the DRX cycle duration can be equal to 8 ms. By selecting the candidate cycle duration closest to the service data arrival cycle duration as the DRX cycle duration of the V2X service, to meet the data delay desirables of the V2X service, the DRX cycle duration can be maximized and the number of times for the terminal to switch between the activation period and the dormancy period back and forth, so as to save the terminal's power to a certain extent.

In certain embodiment(s), in other embodiments, the aforementioned generated DRX cycle duration being less than or equal to the service data arrival cycle duration may also refer to: the generated DRX cycle duration is any one period duration of all candidate cycle durations that are less than the service data arrival cycle duration; or the generated DRX cycle duration is equal to the service data arrival cycle duration. In certain embodiment(s), if the service data arrival cycle duration satisfies the constraint of 2n, the DRX cycle duration may be equal to the service data arrival cycle duration; if the service data arrival cycle duration does not satisfy the constraint of 2k, the DRX cycle duration may be any one period duration of all candidate cycle durations that are less than the service data arrival cycle duration. For example, continuing with the example, the candidate cycle duration may include: 1 ms, 2 ms, 4 ms, and 8 ms. Therefore, the DRX cycle duration may be 1 ms, 2 ms, 4 ms, or 8 ms.

② If the V2X service does not have high desirables for data delay, the waiting duration indicated by the delay tolerance information is greater than a second threshold (the second threshold may be set according to the experience value or service desirable, and the second threshold may be greater than or equal to the first threshold), it is indicated that the data of the V2X service reaches the communication interface, and receiving and sending processings can be conducted after waiting for a period of time. Therefore, if the DRX cycle duration of the DRX cycle is greater than the service data arrival cycle duration of the V2X service, the DRX cycle configuration with one greater than the service data arrival cycle duration of the V2X service can be selected. That is, in this scenario, the DRX cycle duration can be greater than the service data arrival cycle duration of the V2X service.

In one implementation, the generated DRX cycle duration being greater than the service data arrival cycle duration of the V2X service refers to: the generated DRX cycle duration is equal to N times of the service data arrival cycle duration, and N is a positive integer greater than 1. It is to be explained that this implementation is suitable when the N times of the service data arrival cycle duration satisfies the constraint of 2k; if the N times of the service data arrival cycle duration does not satisfy the constraint of 2k, the DRX cycle duration may be the maximum cycle duration of all candidate cycle durations that are less than the N times of the service data arrival cycle duration. Alternatively, the DRX cycle duration may be any one duration greater than the service data arrival cycle duration and satisfying a constraint of 2k. Further alternatively, the DRX cycle duration can also be a total duration of the service data arrival cycle duration and a reference adjustment duration. The reference adjustment duration value meets the following conditions: the reference adjustment duration is greater than 0, and the reference adjustment duration enables the calculated total duration to satisfy the constraint of 2k. It is to be explained that the embodiments of the present disclosure only exemplarily enumerate configuration modes of the configuration cycle duration, and are not exhaustive.

2) For the cyclical V2X service, the ON/OFF period configuration algorithm of the DRX cycle is as follows:

When or in response to determining that the DRX cycle duration of the DRX cycle is determined, the other duration can be determined only by determining either one duration of the ON period (the activation period duration) or the OFF period (the dormancy cycle duration). Therefore, for ease of elaboration, the configuration ON period is used as an example for subsequent explanations. For the V2X service, the configuration of the ON period depends on a predicted data amount of the V2X service in one DRX cycle, a channel busyness degree and/or terminal density of the V2X physical channel, and the delay tolerance information, as follows:

In one implementation, the ON period (the activation period duration) is generated according to the predicted data amount generated by the V2X service in one DRX cycle. In certain embodiment(s), because the V2X service has a larger predicted data amount in one DRX cycle, it is often desirable to increase the ON period to increase the success rate of receiving the service data of the V2X service. On this basis, the predicted data amount of the V2X service in one DRX cycle can be positively correlated with the ON period (the activation period duration), and the positive correlation can be understood as the greater the predicted data amount, the longer the activation period duration. For example, the ON period (the activation period duration) can be estimated by dividing the predicted data amount of the V2X service in one DRX cycle by the data transmission rate of the expected V2X service.

The predicted data amount is determined according to the service data arrival cycle duration and the data burst degree information. For example, if the DRX cycle duration is the same as the service data arrival cycle duration, since the size of the data packet of the cyclical V2X service is usually fixed, or the difference in the sizes of the various data packets is not large, the data amount of one historical data packet can be randomly selected from the data burst degree information as the predicted data amount of the V2X service in one DRX cycle, or the maximum data amount is selected from the data burst degree information as the predicted data amount of the V2X service in one DRX cycle, or an average value of the data amount of each historical data packet in the data burst degree information is used as the predicted data amount of the V2X service in one DRX cycle, etc. If the DRX cycle duration is equal to N times of the service data arrival cycle duration, since the size of the data packet of the cyclical V2X service is usually fixed, or the difference in the sizes of the various data packets is not large, the data amount generated by the V2X service within the N times of the service data arrival cycle duration can be predicted according to the data amount of each historical data packet in the data burst degree information. Moreover, the data amount obtained by prediction is used as the predicted data amount by the V2X service in one DRX cycle.

In one implementation, for the Device-to-Device (D2D)/PC5 link, if the terminal (the Vehicle) density is higher and/or the channel busyness degree is higher, the chance of post-conflict back off would also be increased in a shared resource pool communication mode. Therefore, it increases the ON period to increase the success rate of receiving the service data of the V2X service. On this basis, the computing device may also adjust the ON period (the activation period duration) according to the detected channel busyness degree and/or terminal density. In certain embodiment(s), the channel busyness degree and/or terminal density may be positively correlated with an ON period (the activation period duration), and the positive correlation can be understood as the more occupied channels or the higher channel usage indicated by the channel busyness degree, the longer the activation period duration. The greater the density value corresponding to the terminal density, the longer the activation period duration.

In one implementation, the configuration of the ON period also satisfies the delay tolerance as the premise, the service with the lower delay tolerance increases the ON period more, to achieve the timely transfer of the service data of the V2X service. On this basis, the computing device may also adjust the ON period (the activation period duration) according to the waiting duration indicated by the delay tolerance information. In certain embodiment(s), the waiting duration indicated by the delay tolerance information may be negatively correlated with the ON period (the activation period duration), and the negative correlation may be understood as the shorter the waiting duration indicated by the delay tolerance, the longer the activation period duration.

(II) the V2X Service is an Acyclical Service:

1) for the Acyclical V2X Service, the Configuration Algorithm of the DRX Cycle Duration is as Follows:

the V2X service has delay tolerance information, while the delay tolerance information is determined according to the transmission waiting duration of the service data of the V2X service, and therefore, in order to ensure that the service data of the V2X service can be successfully sent, the DRX cycle duration can be less than the waiting duration indicated by the delay tolerance. The waiting duration indicated by the delay tolerance may be equal to the transmission waiting duration mentioned above, or may be close to (i.e., greater than or less than) the transmission waiting duration mentioned above, which is not limited.

2) for Acyclical V2X Service, the ON/OFF Period Configuration Algorithm of the DRX Cycle is as Follows:

When or in response to determining that the DRX cycle duration of the DRX cycle is determined, the other duration can be determined only by determining either one duration of the ON period (the activation period duration) or the OFF period (the dormancy cycle duration). Therefore, for ease of elaboration, the configuration ON period is used as an example for subsequent explanations. For acyclical V2X service, the configuration of the ON period may depend on a statistical data amount of the V2X service in one DRX cycle, a channel busyness degree and/or terminal density of the V2X physical channel, and the delay tolerance information, as follows:

In one implementation, the ON period (the activation period duration) is determined according to the statistical data amount of the V2X service. In certain embodiment(s), because the V2X service has a larger statistical data amount, it is often desirable to increase the ON period to increase the success rate of receiving the service data of the V2X service. On this basis, the statistical data amount of the V2X service can be positively correlated with the ON period. For example, the ON period (the activation period duration) can be estimated by dividing the statistical data amount of the V2X service by the expected data transmission rate of the V2X service. The statistical data amount is determined after statistically counting a plurality of historical data amounts generated by the V2X service according to data burst degree information corresponding to the V2X service. The historical data amount referred to herein may include any one of the following:

In the first scenario, any historical data amount generated by the V2X service includes: a data amount obtained, during the statistical cycle, by statistically counting the data amount indicated by the data burst degree information corresponding to the V2X service. That is, the computing device in this implementation no longer considers the cyclicity of the service arrival (because the service itself does not have cyclicity), only the data burst degree information can be considered to perform statistics on the data amount of the V2X service in one statistical cycle, estimating the statistical data amount of the V2X service in one statistical cycle. The cycle duration of the statistical cycle can be set according to the experience value or service desirables; Alternatively, the cycle duration of the statistical cycle may also be set according to the DRX cycle duration configured for the V2X service, for example, the cycle duration of the statistical cycle may be equal to the DRX cycle duration.

For example, if the cycle duration of the statistical cycle is 10 ms, the data amount indicated by the data burst degree information is as follows: the data amount of the historical data packet 1 is 100 bytes, the data amount of the historical data packet 2 arrived at 6 ms interval with the historical data packet 1 is 60 bytes, the data amount of the historical data packet 3 arrived at 5 ms interval with the historical data packet 2 is 50 bytes, and the data amount of the historical data packet 4 arrived at 7 ms interval with the historical data packet 3 is 20 bytes . . . a plurality of historical data amounts may be statistically obtained from the time intervals and data amounts of the plurality of historical data packets: the data amount of the historical data packet 1 and the data amount of the historical data packet 2 can be accumulated during the first statistical cycle (0-10 ms), and therefore, the historical data amount 1 corresponding to the first statistical cycle can be statistically obtained, which is equal to 100 bytes+60 bytes=160 bytes. The data amount of the historical data packet 3 and the data amount of the historical data packet 4 can be accumulated during the second statistical cycle (11-20 ms), and therefore, the historical data amount 2 corresponding to the second statistical cycle can be statistically obtained, which is equal to 50 bytes++20 bytes=70 bytes, and so on.

In the second scenario, any historical data amount generated by the V2X service includes: in a statistical cycle, one obtained by statistically counting a data amount buffered by the V2X service in a buffer. For example, if the cycle duration of the statistical cycle is 10 ms, if, in the first statistical cycle (0-10 ms), the data amount of the V2X service buffered in the buffer is 100 bytes, the historical data amount 1 corresponding to the first statistical cycle can be statistically obtained, which is equal to 100 bytes; if in the second statistical cycle (11-20 ms), the data amount of the V2X service buffered in the buffer is 180 bytes, the historical data amount 2 corresponding to the second statistical cycle can be statistically obtained, which is equal to 180 bytes, and so on.

Based on the description, it can be known that one statistical cycle can correspond to one historical data amount. The computing device may determine the statistical data amount for the V2X service targetedly according to the plurality of historical data amounts according to the V2X service desirables for data delay. Details may be as follows: if the waiting duration indicated by the delay tolerance information is less than a first threshold (i.e., the V2X service has a high desirable for data delay), the statistical data amount is a maximum data amount among a plurality of historical data amounts. In this scenario, the ON period (the activation period duration) may be equal to the duration obtained by dividing the statistical data amount by the data transmission rate of the V2X service, so that the maximum data amount can be successfully transmitted by setting a longer activation period. If the waiting duration indicated by the delay tolerance information is greater than a second threshold (i.e., the V2X service has a low desirable for data delay), the statistical data amount is a target data amount determined according to a plurality of historical data amounts. The target data amount herein may be an average value of a plurality of historical data amounts, or may also be a minimum data amount of the plurality of historical data amounts, and so on.

In one implementation, for the Device-to-Device (D2D)/PC5 link, if the terminal (the Vehicle) density is higher and/or the channel busyness degree is higher, the chance of post-conflict back off would also be increased in a shared resource pool communication mode. Therefore, it increases the ON period to increase the success rate of receiving the service data of the V2X service. On this basis, the computing device may also adjust the ON period (the activation period duration) according to the detected channel busyness degree and/or terminal density. In certain embodiment(s), the channel busyness degree and/or terminal density may be positively correlated with the ON period (the activation period duration).

In one implementation, the configuration of the ON period also satisfies the delay tolerance as the premise, the service with the lower delay tolerance increases the ON period more, to achieve the timely transfer of the service data of the V2X service. On this basis, the computing device may also adjust the ON period (the activation period duration) according to the waiting duration indicated by the delay tolerance information. In certain embodiment(s), the waiting duration indicated by the delay tolerance information may be negatively correlated with the ON period (the activation period duration).

Figure 3A:
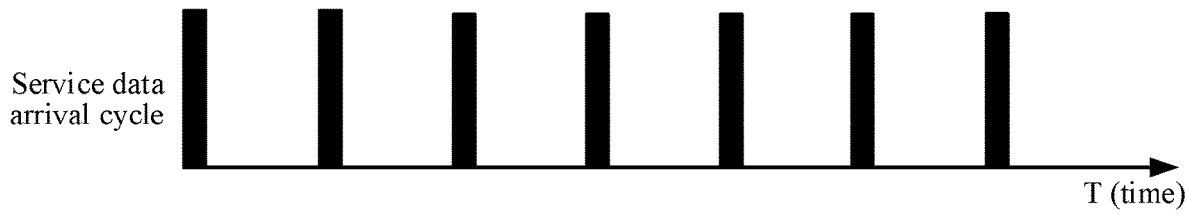
FIG. 3a is a schematic diagram of a relationship between a DRX cycle and a service data arrival cycle of a configuration according to certain embodiment(s) of the present disclosure.
Figure 3B:
FIG. 3b is a schematic diagram of a relationship between a DRX cycle and a service data arrival cycle in another configuration according to certain embodiment(s) of the present disclosure.
Figure 3C:
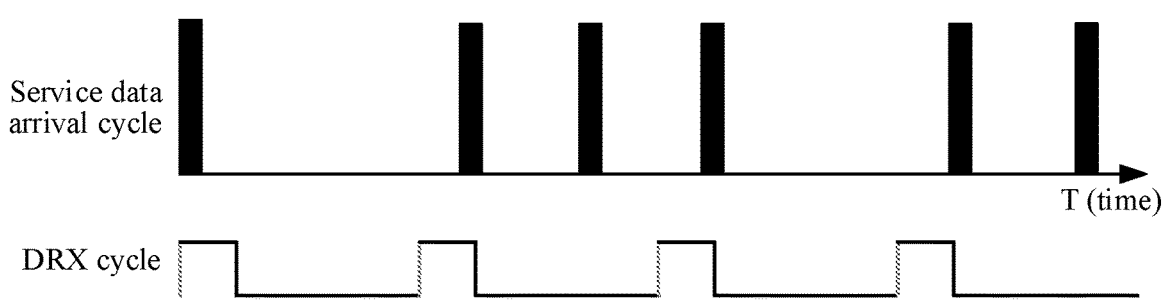
FIG. 3c is a schematic diagram of a DRX cycle of another configuration according to certain embodiment(s) of the present disclosure.

Based on the description, S202 would be further illustrated below by combining with FIG. 3a to FIG. 3c:

(I) For the cyclical V2X service, the data packet of the V2X service reaches a fixed interval and also is usually fixed in size.

If the delay desirable is high, the service data is subjected to receiving and transmitting processings as soon as it arrives. Therefore, the DRX cycle duration can be directly set to the service data arrival cycle duration, and the ON period can be set according to the predicted data amount and typical terminal density of V2X service in one DRX cycle and the channel busyness degree, as shown in FIG. 3a.

If the delay desirable is not high, the DRX cycle duration can be set to N times of the service data arrival cycle duration, while the ON period is still set according to the predicted data amount and typical terminal density of the V2X service in one DRX cycle and channel busyness degree. It is to be explained that the predicted data amount of the V2X service in one DRX cycle is considered to be the predicted data amount of the V2X service in N times of the service data arrival cycle, that is, the setting of the ON period considers the predicted data amount in N times of the service data arrival cycle. Furthermore, the setting of N meets the delay desirables, such as the delay desirables (i.e., the maximum waiting duration) in the buffer is to be greater than the N times of the service data arrival cycle duration. Taking N being equal 2 as an example, the DRX cycle configured for the V2X service may be shown in FIG. 3b.

(II) For the acyclical V2X service, the data packet arrival interval of the V2X service is uncertain, and the data packet size may also be unfixed. In this scenario, the DRX cycle duration of the DRX period and the configuration of the ON period meet the two conditions of the service amount and delay tolerance, as shown in FIG. 3c.

When generating the cycle configuration information, the Quality-of-Service information and service mode information of the V2X service are considered. For a certain specific V2X service, more reasonable and targeted DRX cycle configuration information can be generated. The terminal configured according to the DRX cycle configuration information can not only better ensure that service quality desirables are met during the transmission of the service data, but also save the power of the terminal and increase the standby duration of the terminal.

Based on the description, the embodiment of the present disclosure further provides a cycle configuration method; the cycle configuration method may be performed by the aforementioned smart terminal (i.e., any terminal that provides the V2X service), and the cycle configuration method may include the following steps:

Upon detecting that a vehicle wireless communication technology V2X service is generated, the smart may configure according to cycle configuration information of a discontinuous reception DRX cycle determined for the V2X service, so as to transmit service data corresponding to the V2X service. The cycle configuration information is generated according to Quality-of-Service information and service mode information, the service mode information includes data burst degree information, and the data burst degree information is obtained according to a data amount of service data of the V2X service. The DRX cycle includes an activation period and a dormancy period, and the cycle configuration information includes any one or more of a DRX cycle duration of the DRX cycle, an activation period duration of the activation period, and a dormancy period duration of the dormancy period. It is to be explained that the specific configuration process of the cycle configuration information of the DRX cycle can be described in the method embodiment shown in FIG. 2 above, and will not be repeated herein.

In certain embodiment(s), after the DRX cycle configuration is conducted according to the cycle configuration information, the smart terminal can transfer the service data of the V2X service according to the configured DRX cycle. When the smart terminal is in the activation period within the DRX cycle, the smart terminal can transmit the service data of the V2X service by monitoring the channel. When the smart terminal is in the dormancy period, the terminal can stop monitoring the channel to stop transmitting the service data of the V2X service. It is to be explained that the transmission of the service data for V2X service herein may refer to: receiving the service data for the V2X service and/or sending the service data for the V2X service.

When generating the cycle configuration information, the Quality-of-Service information and service mode information of the V2X service are considered. For a certain specific V2X service, more reasonable and targeted DRX cycle configuration information can be generated. The terminal configured according to the DRX cycle configuration information can not only better ensure that service quality desirables are met during the transmission of the service data, but also save the power of the terminal and increase the standby duration of the terminal.

Figure 4:
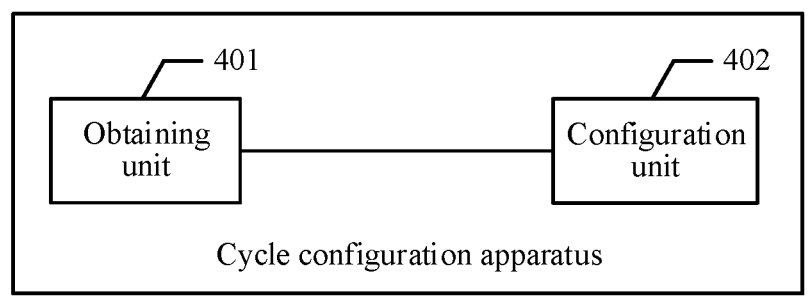
FIG. 4 is a schematic structural diagram of a cycle configuration apparatus according to certain embodiment(s) of the present disclosure.

Based on the relevant description of the method embodiment shown in FIG. 2 above, the embodiment of the present disclosure also provides a cycle configuration apparatus. The cycle configuration apparatus may be a computer program (including program codes) running in the computing device. The cycle configuration apparatus may perform the method shown in FIG. 2. Referring to FIG. 4, the cycle configuration apparatus can operate the following units: an obtainment unit 401, configured to obtain Quality-of-Service information and service mode information of a vehicle wireless communication technology V2X service, the service mode information including data burst degree information, and the data burst degree information being obtained according to a data amount of service data of the V2X service; a configuration unit 402, configured to generate cycle configuration information of a discontinuous reception DRX cycle of the V2X service according to the Quality-of-Service information and the service mode information.

The DRX cycle includes: an activation period and a dormancy period, the cycle configuration information including any one or more of a DRX cycle duration of the DRX cycle, an activation period duration of the activation period, and a dormancy period duration of the dormancy period.

In one implementation, the Quality-of-Service information includes delay tolerance information, and the delay tolerance information is determined according to a transmission waiting duration of service data of the V2X service;

When or in response to determining that the cycle configuration information includes the DRX cycle duration, the DRX cycle duration is less than a waiting duration indicated by the delay tolerance information.

In one implementation, the transmission waiting duration includes: the transmission waiting duration includes a maximum waiting duration for the service data of the V2X service in a buffer.

In one implementation, the V2X service is a cyclical service, and the service mode information further includes: a service data arrival cycle duration of the V2X service; when or in response to determining that the cycle configuration information includes the DRX cycle duration, the DRX cycle duration is less than or equal to the service data arrival cycle duration.

In one implementation, the generated DRX cycle duration is less than the maximum cycle duration of all candidate cycle durations of the service data arrival cycle duration; or the DRX cycle duration is equal to the service data arrival cycle duration.

In one implementation, the V2X service is a cyclical service, and the service mode information includes: a service data arrival cycle duration of the V2X service; when or in response to determining that the cycle configuration information includes the DRX cycle duration, the DRX cycle duration is greater than the service data arrival cycle duration.

In one implementation, the generated DRX cycle duration is equal to N times of the service data arrival cycle duration, and N is a positive integer greater than 1.

In one implementation, the V2X service is a cyclical service, and the service mode information further includes a service data arrival cycle duration of the V2X service; when or in response to determining that the cycle configuration information includes the activation period duration, the activation period duration is generated according to a predicted data amount generated by the V2X service within one DRX cycle, and the activation period duration is positively correlated with the predicted data amount; and the predicted data amount is determined according to the service data arrival cycle duration and data burst degree information.

In one implementation, the Quality-of-Service information includes delay tolerance information, and the delay tolerance information is determined according to a transmission waiting duration of service data of the V2X service; Correspondingly, the configuration unit 402 may be further configured to: adjust the activation period duration according to a waiting duration indicated by the delay tolerance information, the activation period duration and the waiting duration indicated by the delay tolerance information being negatively correlated, and the negative correlation referring to: the longer the waiting duration indicated by the delay tolerance information, the longer the activation period duration.

In one implementation, the V2X service is an acyclic service; when or in response to determining that the cycle configuration information includes the activation period duration, the activation period duration is determined according to a statistical data amount of the V2X service; and the statistical data amount is determined after statistically counting a plurality of historical data amounts generated by the V2X service according to data burst degree information corresponding to the V2X service.

In one implementation, any historical data amount generated by the V2X service includes: in a statistical cycle, a data amount obtained by statistically counting a data amount indicated by the data burst degree information corresponding to the V2X service; or, any historical data amount generated by the V2X service includes: in a statistical cycle, one obtained by statistically counting a data amount buffered by the V2X service in a buffer.

In one implementation, one statistical cycle corresponds to one historical data amount; when or in response to determining that the waiting duration indicated by the delay tolerance information is less than a first threshold, the statistical data amount is a maximum data amount among a plurality of historical data amounts; and when or in response to determining that the waiting duration indicated by the delay tolerance information is greater than a second threshold, the statistical data amount is a target data amount determined by calculation according to the plurality of historical data amounts.

In one implementation, when or in response to determining that the statistical data amount is a maximum data amount, the activation period duration is equal to a duration obtained by dividing the statistical data amount by a data transmission rate of the V2X service.

In one implementation, the configuration unit 402 may further be used for: adjusting the activation period duration according to a detected channel busyness degree and/or terminal density. The activation period duration and the channel busyness degree and/or terminal density are positively correlated. The positive correlation may be understood as that the more occupied channels or the higher the channel use rate indicated by the channel busyness degree, the longer the activation period duration. The greater the density value corresponding to the terminal density, the longer the activation period duration.

According to another embodiment of the present disclosure, units in the cycle configuration method shown in FIG. 4 may be separately or wholly combined into one or several other units, or one (or more) of the units herein may further be divided into multiple units of smaller functions. In this way, same operations can be implemented, and implementation of the technical effects of the embodiments of the present disclosure is not affected. The units are divided based on logical functions. During an implementation, a function of one unit may be implemented by a plurality of units, or functions of a plurality of units are implemented by one unit. In other embodiments of the present disclosure, the cycle configuration apparatus may also include other units. During an implementation, the functions may also be cooperatively implemented by other units and may be cooperatively implemented by a plurality of units.

According to another embodiment of the present disclosure, a computer program (including program code) that can perform the steps in the corresponding method shown in FIG. 2 may run on a general computing device, such as a computer, which includes processing elements and storage elements such as a central processing unit (CPU), a random access memory (RAM), and a read-only memory (ROM), to construct the cycle configuration apparatus shown in FIG. 4, and implement the cycle configuration method in the embodiments of the present disclosure. The computer program may be recorded in, for example, a computer readable recording medium, and may be loaded into the computing device by using the computer readable recording medium, and run in the computing device.

When generating the cycle configuration information, the Quality-of-Service information and service mode information of the V2X service are considered. For a certain specific V2X service, more reasonable and targeted DRX cycle configuration information can be generated. The terminal configured according to the DRX cycle configuration information can not only better ensure that service quality desirables are met during the transmission of the service data, but also save the power of the terminal and increase the standby duration of the terminal.

Figure 5:
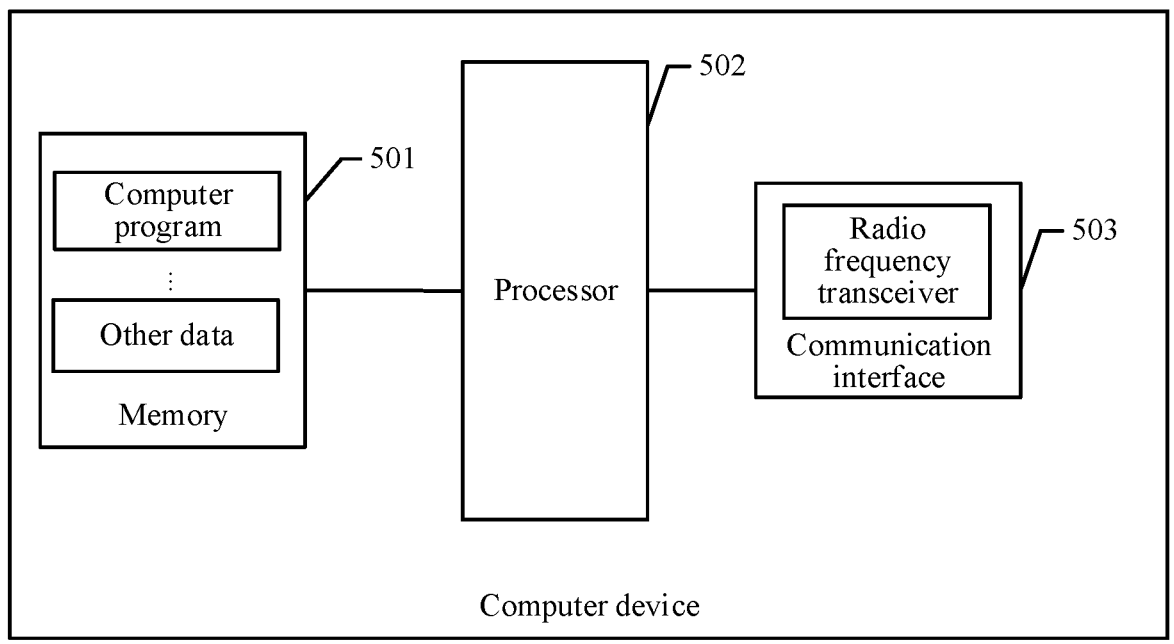
FIG. 5 is a schematic structural diagram of a computing device according to certain embodiment(s) of the present disclosure.

Based on the descriptions of the method embodiments shown in FIG. 2 and apparatus embodiments shown in FIG. 4, an embodiment of the present disclosure further provides a computing device. Referring to FIG. 5, the computing device may at least include a memory 501 and a processor 502. In certain embodiment(s), the computing device may also include a communication interface 503 for data communication. The memory 501, the processor 502, and the communication interface 503 within the computing device may be connected by a bus or other modes. The memory 501 is used for storing a computer program; and the computer program includes a program instruction. The processor 502 (or referred to as a central processing unit (CPU)) is a computing core and a control core of the computing device, and is suitable for implementing one or more instructions, and is suitable for loading and executing one or more instructions to implement a corresponding method procedure or a corresponding function.

In one embodiment, the processor 502 is used for running the computer program to implement the cycle configuration method shown in FIG. 2 above. In certain embodiment(s), the processor 502 may execute the computer program to perform the following steps: obtaining Quality-of-Service information and service mode information of a vehicle wireless communication technology V2X service, the service mode information including data burst degree information, and the data burst degree information being obtained according to a data amount of service data of the V2X service; generating cycle configuration information of a discontinuous reception DRX cycle of the V2X service according to the Quality-of-Service information and the service mode information;

The DRX cycle includes: an activation period and a dormancy period, the cycle configuration information including any one or more of a DRX cycle duration of the DRX cycle, an activation period duration of the activation period, and a dormancy period duration of the dormancy period.

In one implementation, the Quality-of-Service information includes delay tolerance information, and the delay tolerance information is determined according to a transmission waiting duration of service data of the V2X service;

When or in response to determining that the cycle configuration information includes the DRX cycle duration, the DRX cycle duration is less than a waiting duration indicated by the delay tolerance information.

In one implementation, the transmission waiting duration includes: the transmission waiting duration includes a maximum waiting duration for the service data of the V2X service in a buffer.

In one implementation, the V2X service is a cyclical service, and the service mode information further includes a service data arrival cycle duration of the V2X service; when or in response to determining that the cycle configuration information includes the DRX cycle duration, the DRX cycle duration is less than or equal to the service data arrival cycle duration.

In one implementation, the generated DRX cycle duration is less than the maximum cycle duration of all candidate cycle durations of the service data arrival cycle duration; or the DRX cycle duration is equal to the service data arrival cycle duration.

In one implementation, the V2X service is a cyclical service, and the service mode information further includes a service data arrival cycle duration of the V2X service; when or in response to determining that the cycle configuration information includes the DRX cycle duration, the DRX cycle duration is greater than the service data arrival cycle duration.

In one implementation, the generated DRX cycle duration is equal to N times of the service data arrival cycle duration, and N is a positive integer greater than 1.

In one implementation, the V2X service is a cyclical service, and the service mode information further includes: a service data arrival cycle duration of the V2X service; The activation period duration is generated according to a predicted data amount generated by the V2X service within one DRX cycle, and the activation period duration is positively correlated with the predicted data amount. The predicted data amount is determined according to the service data arrival cycle duration and data burst degree information.

In one implementation, the Quality-of-Service information includes delay tolerance information, and the delay tolerance information is determined according to a transmission waiting duration of service data of the V2X service;

Accordingly, the processor 502 may also execute the computer program to perform the following steps: adjusting the activation period duration according to a waiting duration indicated by the delay tolerance information, the activation period duration and the waiting duration indicated by the delay tolerance information are negatively correlated.

In one implementation, the V2X service is an acyclic service; when or in response to determining that the cycle configuration information includes the activation period duration, the activation period duration is determined according to a statistical data amount of the V2X service; and the statistical data amount is determined after statistically counting a plurality of historical data amounts generated by the V2X service according to data burst degree information corresponding to the V2X service.

In one implementation, any historical data amount generated by the V2X service includes: in a statistical cycle, a data amount obtained by statistically counting a data amount indicated by the data burst degree information corresponding to the V2X service; or, any historical data amount generated by the V2X service includes: in a statistical cycle, one obtained by statistically counting a data amount buffered by the V2X service in a buffer.

In one implementation, one statistical cycle corresponds to one historical data amount; when or in response to determining that the waiting duration indicated by the delay tolerance information is less than a first threshold, the statistical data amount is a maximum data amount among a plurality of historical data amounts; and when or in response to determining that the waiting duration indicated by the delay tolerance information is greater than a second threshold, the statistical data amount is a target data amount determined by calculation according to the plurality of historical data amounts.

In one implementation, when or in response to determining that the statistical data amount is a maximum data amount, the activation period duration is equal to a duration obtained by dividing the statistical data amount by a data transmission rate of the V2X service.

In an embodiment, the processor 502 can run the computer program, to perform the following steps: adjusting the activation period duration according to a detected channel busyness degree and/or terminal density, the activation period duration is positively correlated with the channel busyness degree and/or terminal density.

When generating the cycle configuration information, the Quality-of-Service information and service mode information of the V2X service are considered. For a certain specific V2X service, more reasonable and targeted DRX cycle configuration information can be generated. The terminal configured according to the DRX cycle configuration information can not only better ensure that service quality desirables are met during the transmission of the service data, but also save the power of the terminal and increase the standby duration of the terminal.

Figure 6:
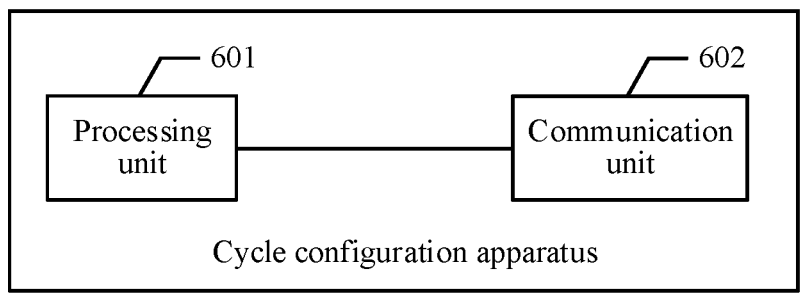
FIG. 6 is a schematic structural diagram of a cycle configuration apparatus according to certain embodiment(s) of the present disclosure.

Based on the related description of the method embodiment of the cycle configuration method on the smart terminal side, the embodiment of the present disclosure also provides a cycle configuration apparatus. The cycle configuration apparatus may be a computer program (including program codes) running in the smart terminal. Referring to FIG. 6, the cycle configuration apparatus can operate the following units: a processing unit 601, configured to, in response to detecting that a vehicle wireless communication technology V2X service is generated, configure according to cycle configuration information of a discontinuous reception DRX cycle determined for the V2X service, so as to transmit service data corresponding to the V2X service; where the cycle configuration information is generated according to Quality-of-Service information and service mode information, the service mode information includes data burst degree information, and the data burst degree information is obtained according to a data amount of service data of the V2X service; and The DRX cycle includes: an activation period and a dormancy period, the cycle configuration information including any one or more of a DRX cycle duration of the DRX cycle, an activation period duration of the activation period, and a dormancy period duration of the dormancy period.

In certain embodiment(s), the cycle configuration apparatus can run the communication unit 602; the communication unit is used for transmit the service data corresponding to the V2X service according to the configured DRX cycle.

Figure 7:
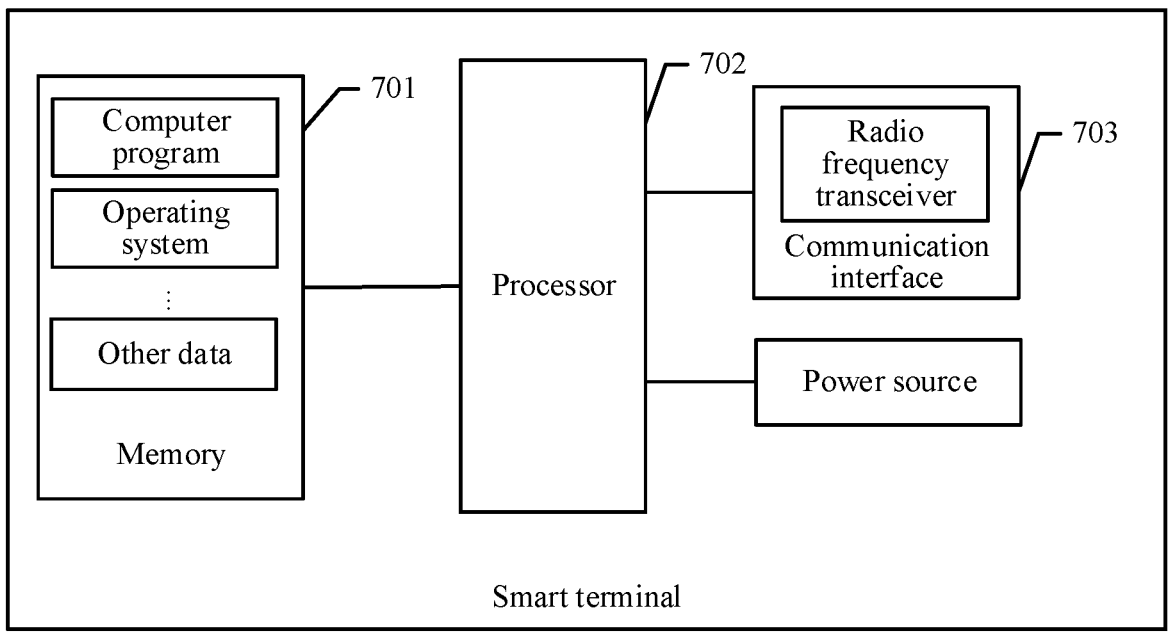
FIG. 7 is a schematic structural diagram of a smart terminal according to certain embodiment(s) of the present disclosure.

In yet another embodiment, the embodiment of the present disclosure further provides a smart terminal. Referring to FIG. 7, the smart terminal may at least include a memory 701 and a processor 702. In certain embodiment(s), the smart terminal may also include a communication interface 703 for data communication. The memory 701, the processor 702, and the communication interface 703 within the smart terminal may be connected through a bus or other modes. The memory 701 is used for storing a computer program; and the computer program includes a program instruction. The processor 702 (or referred to as a central processing unit, CPU) is a computing core and a control core of the smart terminal, and is suitable for implementing one or more instructions, and is suitable for loading and executing one or more instructions to implement a corresponding method procedure or a corresponding function.

In one embodiment, the processor 702 is used for running the computer program to implement the cycle configuration method shown above on the smart terminal side. In certain embodiment(s), the processor 702 may execute the computer program to perform the following steps: n response to detecting that a vehicle wireless communication technology V2X service is generated, configuring according to cycle configuration information of a discontinuous reception DRX cycle determined for the V2X service, so as to transmit service data corresponding to the V2X service; where the cycle configuration information is generated according to Quality-of-Service information and service mode information, the service mode information includes data burst degree information, and the data burst degree information is obtained according to a data amount of service data of the V2X service; and The DRX cycle includes: an activation period and a dormancy period, the cycle configuration information including any one or more of a DRX cycle duration of the DRX cycle, an activation period duration of the activation period, and a dormancy period duration of the dormancy period.

When generating the cycle configuration information, the Quality-of-Service information and service mode information of the V2X service are considered. For a certain specific V2X service, more reasonable and targeted DRX cycle configuration information can be generated. The terminal configured according to the DRX cycle configuration information can not only better ensure that service quality desirables are met during the transmission of the service data, but also save the power of the terminal and increase the standby duration of the terminal.

It is to be explained that according to an aspect of the present disclosure, the embodiments of the present disclosure further provide a computer storage medium (Memory), and the computer storage medium is a memory device in a device (computing device or smart terminal) and is configured to store programs and data. It may be understood that the computer storage medium herein may include an internal storage medium of the device and may also include an extended storage medium supported by the device. The computer storage medium provides storage space, and the storage space stores an operating system of the computing device. In addition, the storage space further stores one or more instructions that are suitable for being loaded and executed by the processor, and the instructions may be one or more computer programs (including program code). It is to be explained that the computer storage medium herein may be a high-speed RAM memory, or may be a non-volatile memory, such as at least one magnetic disk storage. In certain embodiment(s), the computer storage medium may further be at least one computer storage medium far away from the processor. When the computer program in a computer storage medium is executed by a processor, the above-described cycle configuration method of the computing device side will be implemented; or the cycle configuration method described above of the smart terminal side will be implemented.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

According an aspect of the present disclosure, the embodiments of the present disclosure further provide a computer program product or a computer program, the computer program product or the computer program including computer instructions, the computer instructions being stored in a computer readable storage medium. A processor of a computing device reads the computer instructions from the computer readable storage medium, and performs the computer instructions, causing the computing device to perform the methods provided in the various optional manners of the embodiments of the cycle configuration method.

It should be understood that the disclosure is merely exemplary embodiments of the present disclosure, and is not intended to limit the protection scope of the present disclosure. Therefore, equivalent variations made in accordance with the claims of the present disclosure shall fall within the scope of the present disclosure.

What is claimed is:

1. A cycle configuration method, performed by a computing device, the method comprising:
   obtaining Quality-of-Service information and service mode information of a vehicle to everything (V2X) service, the service mode information including data burst degree information, and the data burst degree information being obtained according to a data amount of service data of the V2X service;
   generating cycle configuration information of a discontinuous reception (DRX) cycle of the V2X service according to the Quality-of-Service information and the service mode information, wherein:
   the DRX cycle includes an activation period and a dormancy period, and the cycle configuration information includes at least a DRX cycle duration of the DRX cycle;
   the Quality-of-Service information includes delay tolerance information, and the delay tolerance information is determined according to a transmission waiting duration of service data of the V2X service; and
   the DRX cycle duration is less than a waiting duration indicated by the delay tolerance information.

2. The method according to claim 1, wherein the transmission waiting duration includes a maximum waiting duration for the service data of the V2X service in a buffer.

3. The method according to claim 1, wherein the V2X service is a cyclical service, and the service mode information further includes a service data arrival cycle duration of the V2X service; and
   in response to determining that the cycle configuration information includes the DRX cycle duration, the DRX cycle duration is less than or equal to the service data arrival cycle duration.

4. The method according to claim 3, wherein the DRX cycle duration is less than a maximum cycle duration of all candidate cycle durations of the service data arrival cycle duration; or
   the DRX cycle duration is equal to the service data arrival cycle duration.

5. The method according to claim 1, wherein the V2X service is a cyclical service, and the service mode information includes a service data arrival cycle duration of the V2X service; and
   in response to determining that the cycle configuration information includes the DRX cycle duration, the DRX cycle duration is greater than the service data arrival cycle duration.

6. The method according to claim 5, wherein the DRX cycle duration is equal to N times the service data arrival cycle duration, and N is a positive integer greater than 1.

7. The method according to claim 1, wherein the V2X service is a cyclical service, and the service mode information further includes a service data arrival cycle duration of the V2X service; and
   in response to determining that the cycle configuration information includes the activation period duration, the activation period duration is generated according to a predicted data amount generated by the V2X service within one DRX cycle, and the activation period duration is positively correlated with the predicted data amount; and
   the predicted data amount is determined according to the service data arrival cycle duration and data burst degree information.

8. The method according to claim 7, further comprising:
   adjusting the activation period duration according to the waiting duration indicated by the delay tolerance information, the activation period duration and the waiting duration indicated by the delay tolerance information are negatively correlated.

9. The method according to claim 1, wherein the V2X service is an acyclic service;
   in response to determining that the cycle configuration information includes the activation period duration, the activation period duration is determined according to a statistical data amount of the V2X service; and
   the statistical data amount is determined after statistically counting a plurality of historical data amounts generated by the V2X service according to data burst degree information corresponding to the V2X service.

10. The method according to claim 9, wherein
any historical data amount generated by the V2X service includes: in a statistical cycle, a data amount obtained by statistically counting a data amount indicated by the data burst degree information corresponding to the V2X service; or
a historical data amount generated by the V2X service comprises: in a statistical cycle, one obtained by statistically counting a data amount buffered by the V2X service in a buffer.

11. The method according to claim 9, wherein one statistical cycle corresponds to one historical data amount;
in response to determining that the waiting duration indicated by the delay tolerance information is less than a first threshold, the statistical data amount is a maximum data amount among a plurality of historical data amounts; and
in response to determining that the waiting duration indicated by the delay tolerance information is greater than a second threshold, the statistical data amount is a target data amount determined by calculation according to the plurality of historical data amounts.

12. The method according to claim 11, wherein in response to determining that the statistical data amount is a maximum data amount, the activation period duration is equal to a duration obtained by dividing the statistical data amount by a data transmission rate of the V2X service.

13. The method according to claim 1, further comprising:
adjusting the activation period duration according to a detected channel busyness degree and/or terminal density, the activation period duration being positively correlated with the channel busyness degree and/or terminal density.

14. A cycle configuration method, performed by a smart terminal, the method comprising:
in response to detecting that a vehicle to everything (V2X) service is generated, configuring to transmit service data corresponding to the V2X service according to cycle configuration information of a discontinuous reception (DRX) cycle determined for the V2X service; wherein
the cycle configuration information is generated according to Quality-of-Service (QOS) information and service mode information, the service mode information including data burst degree information obtained according to a data amount of service data of the V2X service; and
wherein the DRX cycle includes an activation period and a dormancy period, the cycle configuration information includes one or more of: a DRX cycle duration of the DRX cycle, an activation period duration of the activation period, and a dormancy period duration of the dormancy period;

the QoS information includes delay tolerance information, and the delay tolerance information is determined according to a transmission waiting duration of service data of the V2X service; and
the DRX cycle duration is less than a waiting duration indicated by the delay tolerance information.

15. A cycle configuration device, comprising: a memory storing computer program instructions; and a processor coupled to the memory and configured to execute the computer program instructions and perform:
obtaining Quality-of-Service (QOS) information and service mode information of a vehicle to everything (V2X) service, the service mode information including data burst degree information, and the data burst degree information being obtained according to a data amount of service data of the V2X service; and
generating cycle configuration information of a discontinuous reception DRX cycle of the V2X service according to the QOS information and the service mode information,
wherein:
the DRX cycle includes an activation period and a dormancy period, and the cycle configuration information includes one or more of: a DRX cycle duration of the DRX cycle, an activation period duration of the activation period, and a dormancy period duration of the dormancy period;
the QoS information includes delay tolerance information, and the delay tolerance information is determined according to a transmission waiting duration of service data of the V2X service; and
the DRX cycle duration is less than a waiting duration indicated by the delay tolerance information.

16. The cycle configuration device according to claim 15, wherein the transmission waiting duration includes a maximum waiting duration for the service data of the V2X service in a buffer.

17. The cycle configuration device according to claim 15, wherein the V2X service is a cyclical service, and the service mode information further includes a service data arrival cycle duration of the V2X service; and
in response to determining that the cycle configuration information includes the DRX cycle duration, the DRX cycle duration is less than or equal to the service data arrival cycle duration.

18. The cycle configuration device according to claim 17, wherein the DRX cycle duration is less than a maximum cycle duration of all candidate cycle durations of the service data arrival cycle duration; or
the DRX cycle duration is equal to the service data arrival cycle duration.

* * * * *